United States Patent [19]

Takahashi et al.

[11] Patent Number: 4,636,931
[45] Date of Patent: Jan. 13, 1987

[54] PHOTOVOLTAIC POWER CONTROL SYSTEM

[75] Inventors: Masahide Takahashi; Seiichi Sakai; Osamu Masada; Masaru Ukawa; Hamao Onishi, all of Kagawa, Japan

[73] Assignees: Shikoku Denryoku Kabushiki Kaisha, Takamatsu; Shikoku Keisoku Kogyo Kabushiki Kaisha, Nakatado, both of Japan

[21] Appl. No.: 824,856

[22] Filed: Jan. 31, 1986

[30] Foreign Application Priority Data

Jun. 28, 1985 [JP] Japan .................................. 60-140633
Dec. 9, 1985 [JP] Japan .................................. 60-277673

[51] Int. Cl.⁴ ................................................ H02J 7/10
[52] U.S. Cl. .......................................... 363/71; 320/2; 323/906
[58] Field of Search ...................... 363/71, 95, 97, 131, 363/132, 133, 134; 323/906; 320/2, 39, 40

Primary Examiner—Peter S. Wong
Assistant Examiner—Judson H. Jones
Attorney, Agent, or Firm—Fleit, Jacobson, Cohn & Price

[57] ABSTRACT

There is disclosed a photovoltaic power control system equipped with at least one inverter for inverting an output of a solar cell array to AC power, and having charge-and discharge control means for charging a surplus portion with respect to the power for expected use of the output of the solar cell array to a storage battery and discharging shortage portion with respect to the power for expected use of the output of the solar cell array from the storage battery by detecting the surplus or shortage produced between the output of the solar cell array and AC power for expected use inverted by the inverter, the improvement comprising weather fluctuation pattern selection means for selecting one weather pattern out of various kinds of weather patterns preset based on weather information at a time point when the weather is forecasted on the day when the power is generated by the solar cell array; and workable pattern selection means for selecting one actuation pattern of the inverter corresponding to the weather pattern selected by the weather fluctuation pattern selection means out of various actuation patterns of the inverter preset corresponding to the weather pattern.

3 Claims, 8 Drawing Figures

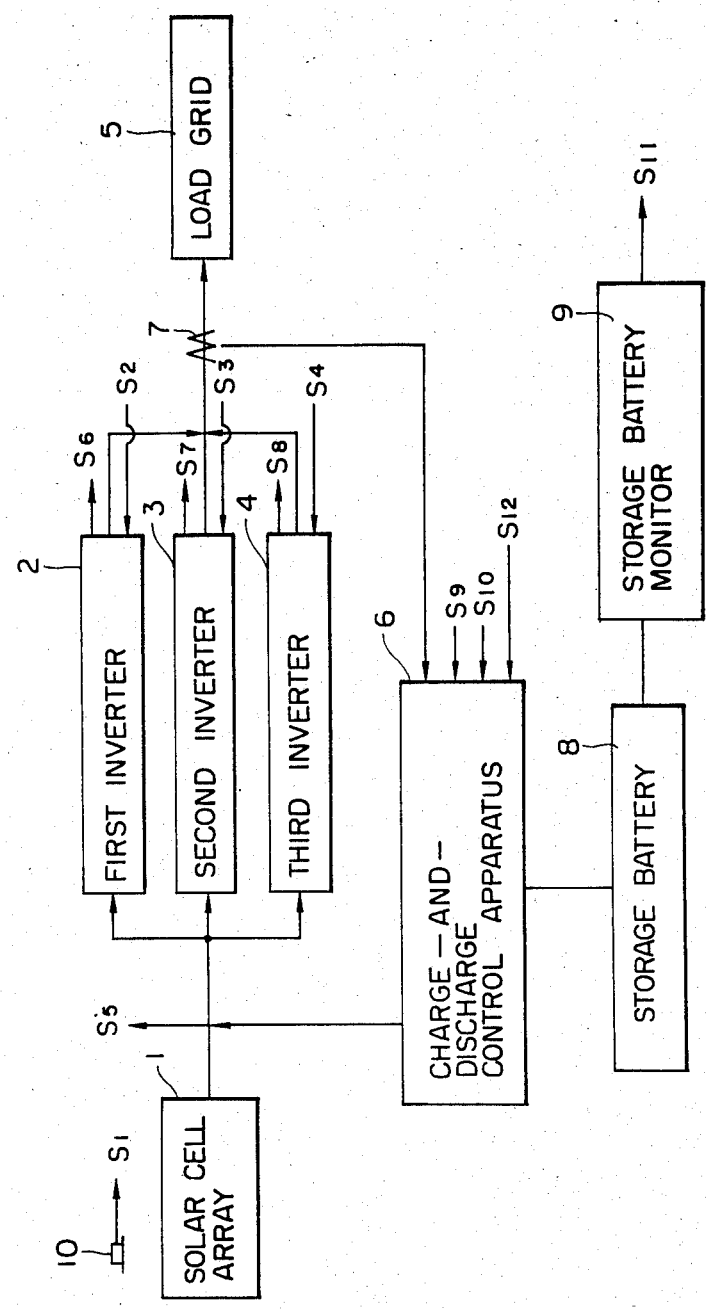
F I G. 2

PHOTOVOLTAIC POWER CONTROL SYSTEM

BACKGROUND OF THE INVENTION

1. Field of the Invention

This invention relates to a photovoltaic power control system for inverting the output of a solar cell array which generates an electric power upon receipt of the sun light, and more particularly to an improvement of a photovoltaic power control system which can be efficiently controlled according to fluctuation of solar radiation quantity.

2. Description of the Related Art

There is well known a photovoltaic power control system for efficiently feeding an electric power to a load grid by controlling a storage battery in such a manner as to be charged surplus of electric power, or discharged shortage of electric power when an output of a solar cell array is fed to the load grid through an inverter.

However, since the solar cell array is largely affected by weather condition on the day when the power is generated, especially by the fluctuation of solar radiation quantity, a mere provision of chargable- and dischargable storage battery is not sufficient to obtain a stable supply of electric power.

SUMMARY OF THE INVENTION

It is therefore a general object of the present invention to provide a photovoltaic power control system wherein the afore-mentioned problem inherent in the related art can be eliminated.

In order to achieve the above object, there is essentially provided a photovoltaic power control system which is constituted as follow. As shown in FIG. 1, a weather condition on the day when the power is generated is selected one from various weather fluctuation patterns preset based on, for example, early morning weather forecast, etc. by a weather fluctuation pattern selected means 11. Based on such selected weather fluctuation pattern, a workable pattern for deciding the actuation time of inverters 2, 3, and 4 is selected by a workable pattern selected means 15. According to the workable pattern, the inverters 2, 3, and 4 invert the power to an AC power. At the same time, when a surplus or shortage is occurred in the output of the solar cell array 1 with respect to the AC power inverter by the inverters 2, 3 and 4 for expected use, controlling of the charge and discharge of the electric power to and from a storage battery 8 is made by a charge- and discharge control means 6 according to the surplus and shortage thereof, and thus, an efficient and stable driving of a photovoltaic power with respect to a load system 5 is obtained.

When a weather fluctuation pattern on the day is selected, a workable pattern is selected based thereon, and the actuation time of the inverters adapted to invert the output of the solar cell array to an AC power is automatically set. Surplus of electric power of the output of the solar cell array with respect to the electric power for expected use of the inverter is properly charged to the solar cell array. When shortage of the electric power is occurred, the power is properly discharged from a storage battery to the load grid through the inverter.

BRIEF DESCRIPTION OF THE DRAWINGS

The foregoing and other objects, features and advantages of the present invention will become apparent from the following detailed description of the embodiment of the present invention as illustrated in the accompanying drawings wherein:

FIG. 2 is a block diagram showing a hardware constitution of a system according to the present invention;

DETAILED DESCRIPTION OF THE EMBODIMENTS

Figure 1:
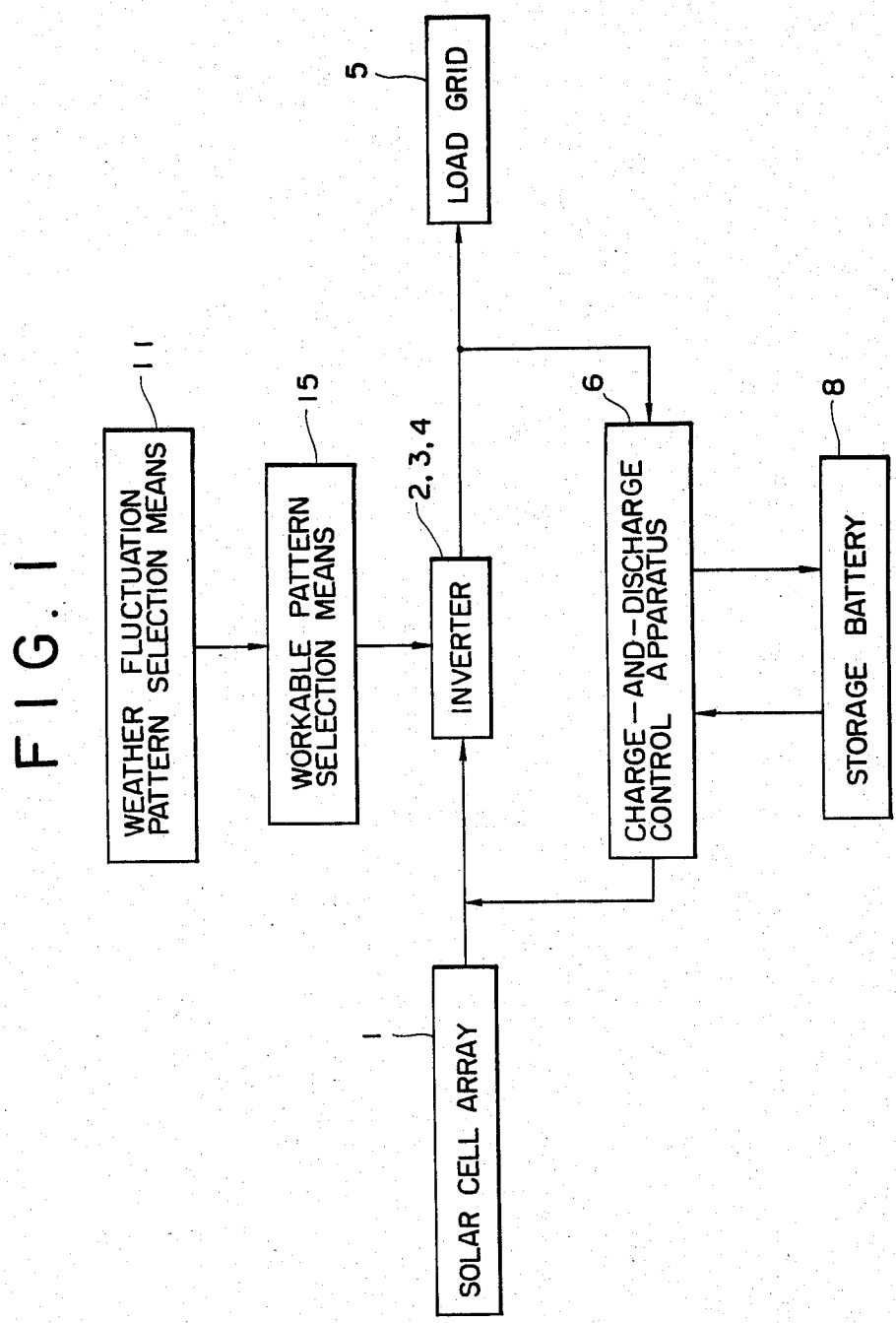
FIG. 1 is a schematic illustration corresponding to claims.

A preferred embodiment of the present invention will be described hereunder with reference to the accompanying drawings.

As shown in FIG. 2, a solar cell array 1 has three units of first, second and third inverters 2, 3 and 4 at its output side. Connected to the output side of the respective inverters 2, 3 and 4 is a load system 5 adapted to feed an electric power. Likewise, connected to the input side of the respective inverters 2, 3 and 4 is the output side of a charge- and discharge control apparatus 6. This charge- and discharge control apparatus 6 is connected to a power detecting current tansformer 7 disposed at the output side of the respective inverters 2, 3 and 4. Further, this charge- and discharge control apparatus 6 is connected with a storage battery 8 and a storage battery monitor 9. On the other hand, disposed in the vicinity of the solar cell array 1 is an actinometer 10.

Figure 3:
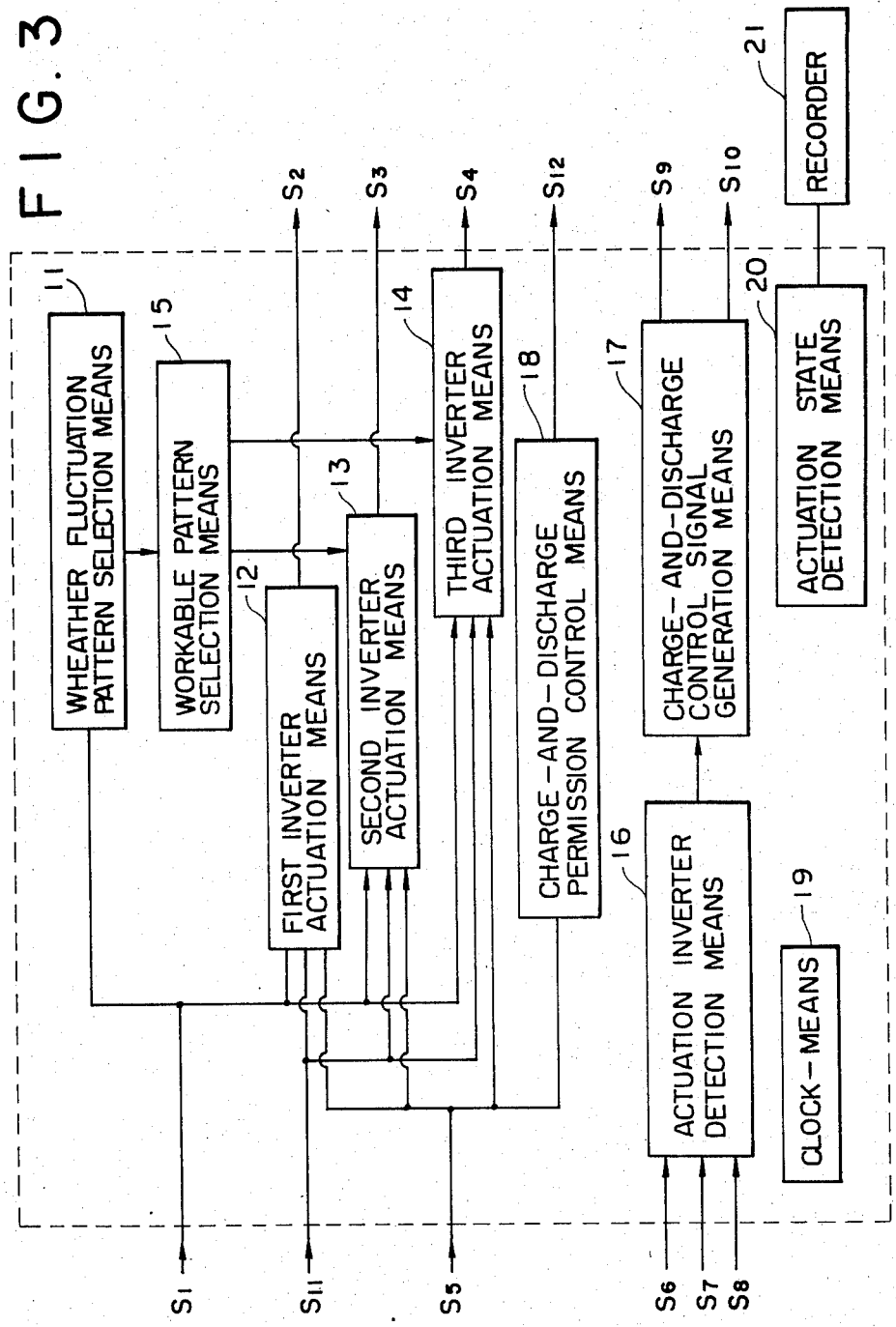
FIG. 3 is likewise a block diagram showing in greater detail the constitution of FIG. 2.

FIG. 3 illustrates a relation thereof with the respective signals $S_1$ through $S_{12}$ shown in FIG. 2. A solar radiation signal $S_1$ from the actinometer 10 is fed to a weather fluctuation pattern selecting means 11 and also to first through third inverter actuation means 12, 13 and 14, respectively. And, the output of the weather fluctuation pattern selected means 11 is fed to a workable pattern selection means 15. The output of the workable pattern selection means 15 is fed to the respective inverter actuation means 12, 13 and 14. From the respective actuation means 12, 13 and 14, the respective first, second and third inverter actuation instruction signals $S_2$, $S_3$ and $S_4$ are fed to the respective inverters 2, 3 and 4. The output signal $S_5$ of the solar cell array 1 is fed to the respective inverter actuation means 12, 13 and 14.

It is noted that the weather fluctuation pattern selection means 11 and workable pattern selection means 15, or means for controlling respective signals related to them constitute a function means of a micro-computer.

First, second and third actuation detecting signals $S_6$, $S_7$ and $S_8$ are outputted from the respective inverters 2, 3 and 4. The respective actuation detection signals are fed to an actuation inverter detection means 16. Further, the output of the actuation inverter detection means 16 is fed to a charge- and discharge control signal generation means 17. From this charge- and discharge control signal generation means 17, an upper limit electric power instruction signal $S_9$ and a lower limit electric power instruction signal $S_{10}$ are generated. Both the signals $S_9$ and $S_{10}$ are fed to the charge- and discharge control apparatus 6 shown in FIG. 1, respectively. Connected to the charge- and discharge control apparatus 6 is the storage battery monitor 9. From the storage battery monitor 9, a remaining quantity detecting signal $S_{11}$ is outputted. The remaining quantity detection signal S11 is fed to the first, second and third inverter actuation means 12, 13 and 14 respectively, and also to a charge- and discharge permission control means 18. And, a charge- and discharge instruction signal $S_{12}$ from the charge- and discharge permission control means 18 is fed to the afore-mentioned charge- and discharge electric power control apparatus 6.

In FIG. 3, reference numeral 19 denotes a clock means for deciding a time base of action of the respective means, and reference numeral 20 denotes an actuation state detection means for detecting the actuation state of the respective means. Likewise, reference numeral 21 denotes a recorder adapted to undertake a recording based on the output of the actuating state detection means 20.

Next, operation of a system according to this embodiment will be described with reference to FIGS. 4 and 5, and TABLES 1 and 2.

Figure 4:
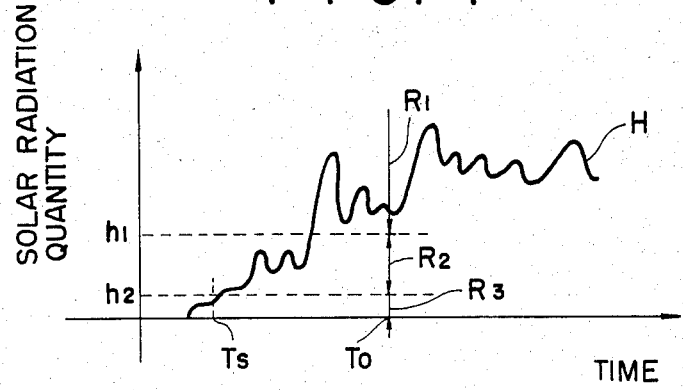
FIG. 4 is a graph for explaining a selection of a weather fluctuation pattern.
Figure 5:
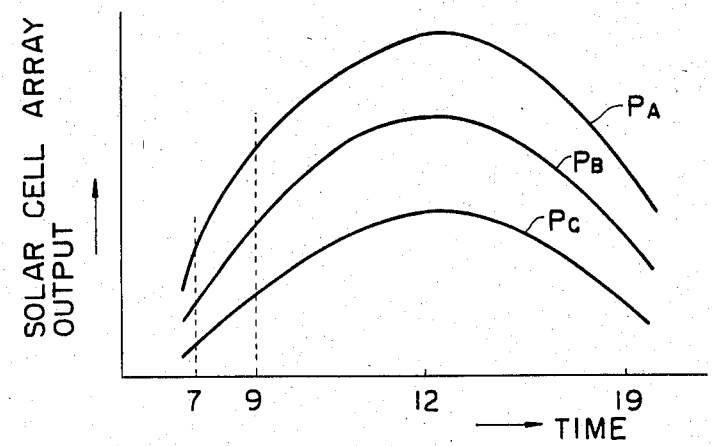
FIG. 5 is likewise a graph for explaining a weather pattern.

First of all, in order to select a desired weather fluctuation pattern, the recorder 21 starts recording the solar radiation signal $S_1$ as soon as the system starts operation and a solar radiation fluctuation curve H is obtained as shown, for example, in FIG. 4. Based on the foregoing, an average quantity of the solar radiation within a certain time from an actuation start time point $T_s$ [a certain time after sun rise (7.00 AM, for example) to a weather anticipation time point $T_o$ (9.00 AM, for example)] of the system is calculated, and such calculated result is used for judging what relation it will have with respect to, for example, a pre-set solar radiation quantity upper limit value $h_1$ or solar radiation quantity lower limit value $h_2$. That is, the judgement is made on whether the obtained average solar radiation quantity is in a region $R_1$ exceeding the solar radiation quantity upper limit value $h_1$ or in a region $R_2$ between the solar radiation quantity upper limit value $h_1$ and the solar radiation quantity lower limit value $h_2$ or in a region $R_3$ below the solar radiation quantity lower limit value $h_2$. Based on the foregoing, a suitable weather fluctuation pattern is selected corresponding thereto.

Next, selection of a weather pattern will be described in detail. Depending on which region the calculated average solar radiation quantity belongs, one pattern out of, for example, fine pattern $P_A$, cloudy pattern $P_B$ and rainy pattern $P_C$ is selected as a preset weather pattern, as shown in FIG. 5, from a tabulation of, for example, a weather forecast of past several years, or detailed meteorological data obtained by a meteorological satellite. In this case, if the aforementioned 3 patterns are further classified in several patterns, for example, 12 patterns as will be described hereinafter according to four seasons, a complete patterns can be obtained, which can sufficiently meet with fluctuation of the solar radiation quantity throughout a year. The respective weather patterns $P_A$, $P_B$ and $P_C$ can also be selected based on a weather forecast at the weather anticipation time point $T_o$.

TABLE 1

| WEATHER FORECAST | WEATHER PATTERN |
|---|---|
| CLOUDY AFTER FINE, FINE AFTER CLOUDY, FINE AND TEMPORARY RAINY, FINE AND SOMETIME CLOUDY, CLOUDY AND SOMETIME FINE | FINE PATTERN |
| CLOUDY, FINE AND SOMETIME CLOUDY, CLOUDY AND SOMETIME FINE, RAINY AFTER CLOUDY, CLOUDY AFTER RAINY, CLOUDY AND TEMPORARY RAINY, CLOUDY AND SOMETIME RAINY | CLOUDY PATTERN |
| RAINY, OTHERS | RAINY PATTERN |

When a weather pattern is selected, an actuation pattern of inverters (in this case, actuation unit number of inverters) is selected. In the case a photovoltaic power control system of 600 KW class is used for example, since the upper limit value and the lower limit value of the power for expected use by the inverters according to weather patterns are already known in detail as shown in TABLE 2 listed hereunder, the actuation patterns of the inverters are automatically decided corresponding to the respective weather patterns. It is noted that the term "power for expected use" means a usable AC power inverter by the inverters. It may be equal to the maximum output of the inverters. In general, however, it is set to be somewhat lower than the maximum output of the inverters. In some cases (especially, when several units of inverters are actuated), it is set to be within a predetermined range as shown in TABLE 2.

TABLE 2

| | | POWER FOR EXPECTED USE (KW) | |
|---|---|---|---|
| SEASONS | WEATHER PATTERNS | UPPER LIMIT | LOWER LIMIT |
| SPRING | FINE PATTERN | 425 | 215 |
| | CLOUDY PATTERN | 205 | 150 |
| | RAINY PATTERN | 150 | 125 |
| SUMMER | FINE PATTERN | 415 | 210 |
| | CLOUDY PATTERN | 240 | 160 |
| | RAINY PATTERN | 150 | 125 |
| FALL | FINE PATTERN | 375 | 205 |
| | CLOUDY PATTERN | 170 | 140 |
| | RAINY PATTERN | 150 | 125 |
| WINTER | FINE PATTERN | 330 | 170 |
| | CLOUDY PATTERN | 145 | 130 |
| | RAINY PATTERN | 150 | 125 |

That is, when a weather pattern is selected at the weather anticipation time point $T_o$, the upper limit values of the power for expected use are known as 425 KW, 205 KW and 150 KW for fine day, cloudy day and rainy day of, for example, the spring season, respectively. Therefore, as shown in TABLE 3, inverters with a maximum capacity of, for example, 175 KW may be actuated in the unit number of 3, 2 and 1, respectively.

TABLE 3

| UPPER LIMIT VALUE OF POWER FOR EXPECTED USE (KW) | ACTUATION PATTERN (UNIT NUMBER OF INVERTERS FOR ACTUATION) |
| --- | --- |
| 425 | 175 KW × 3 |
| 205 | 175 KW × 2 |
| 150 | 175 KW × 1 |
| 415 | 150 KW × 3 |
| 240 | 150 KW × 2 |
| 145 | 150 KW × 1 |
| 375 | 200 KW × 2 |
| 170 | 200 KW × 1 |
| 150 | 200 KW × 1 |
| 330 | 175 KW × 2 |
| 145 | 175 KW × 1 |
| 150 | 175 KW × 1 |

When a weather pattern and an actuation pattern are selected in this way, a predetermined inverter starts actuation, and the solar cell array 1 starts feeding the electric power to the load system 5.

Figure 6:
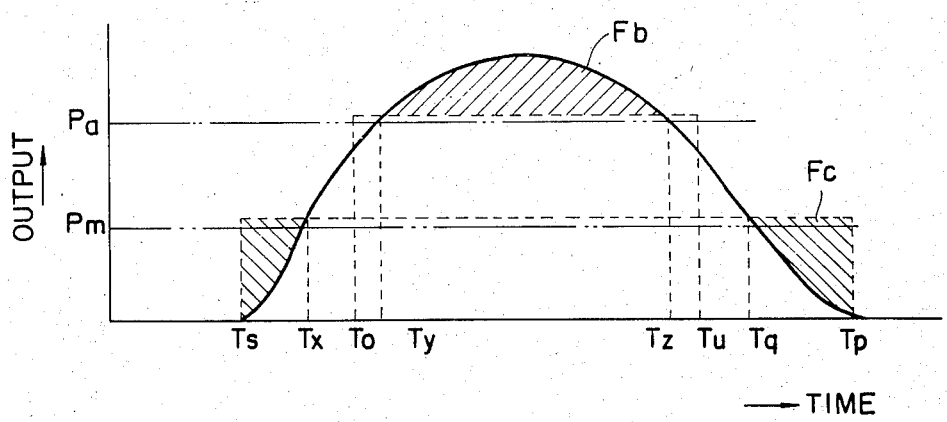
FIG. 6 is a graph for explaining one example of the driving of a photovoltaic power control system.

For example, in the case of a fine pattern of the winter season, as shown in FIG. 6, a first inverter 2 with a capacity of, for example, 175 KW starts actuation at the time when the system starts operation. Upon selection of the weather pattern and actuation pattern, a second inverter 3 with a capacity of, for example 175 KW in addition to the first inverter 2 starts actuation after the weather anticipation time point $T_o$. It is noted that the feeding of the electric power based on solely the solar cell array 1 is difficult from an operation start time point $T_s$ of the system till a time point $T_x$ where the output of the solar cell array 1 exceeds the maximum output [a value close to the lower limit value $P_m$ (170 KW) of the power for expected use] of the first inverter 2. In this case, the shortage (a portion shown by $F_a$ in FIG. 6) is compensated with a power feeding by the discharge of the storage battery 8.

And, after a time point $T_y$ when the solar radiation quantity increases as time passes and the output of the solar cell array 1 exceeds the upper limit value $P_a$ (330 KW) of the power for expected use by the first and the second inverters 2 and 3, the surplus of the output (the portion shown by $F_b$ in FIG. 6) is charged to the storage battery 8. After a time point $T_z$ when time further passes to decrease the solar radiation quantity, and the output of the solar cell battery 1 becomes less than the upper limit value $P_a$ of the power for expected use, the charging to the storage battery 8 is stopped. When the solar radiation quantity is further decreased and the output of the solar cell array 1 becomes less than the upper limit value $P_a$ of the power for expected use, the actuation of the second inverter 3 is stopped (time $T_y$), and only the first inverter 2 keeps actuation. And, when the sun set approaches and the output of the solar cell array 1 becomes less than the lower limit value $P_a$ of the power for expected use (time $T_q$), the shortage (the portion shown by $F_c$ in FIG. 6) is compensated with the feeding of the electric power discharged by the storage battery 8 again. At a time point $T_p$ when the remaining capacity of the storage battery 8 becomes, for example, 80%, operation of the system is stopped on the day when the power is generated.

Figure 7:
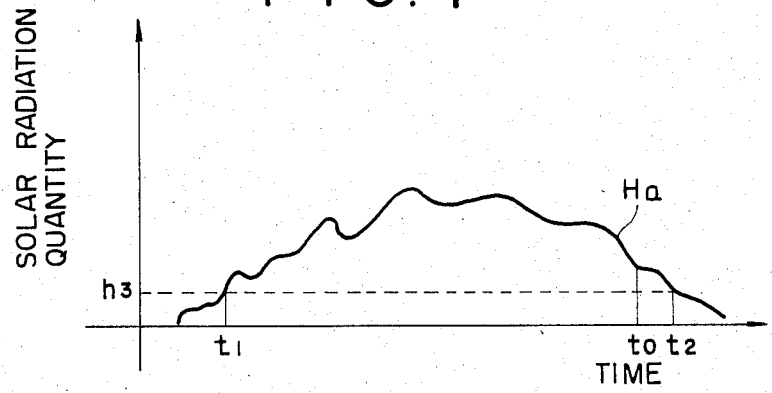
FIG. 7 is a graph for explaining a driving pattern thereof.
Figure 8:
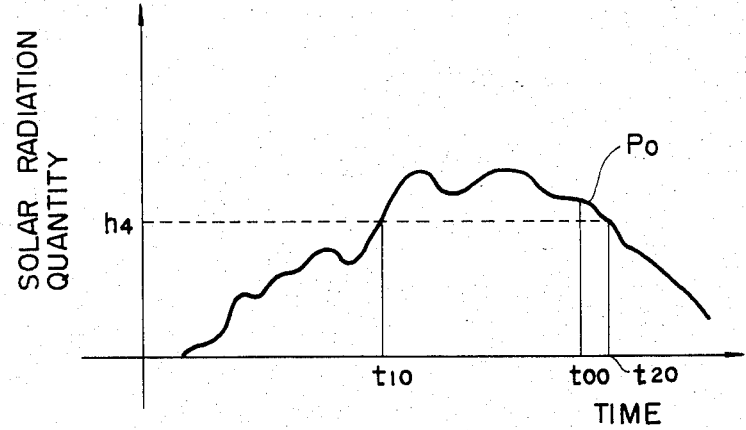
FIG. 8 is a graph for explaining another driving pattern.

The selection of actuation patterns may be based on the selected weather pattern which is obtainable based on expected whole day solar radiation quantity fluctuation curve $H_a$, as shown, for example, in FIG. 7 on the day when the power is generated. That is, the actuation start setting time point $t_1$ and the actuation stop advance notice setting time point $t_o$ of the respective inverters 2, 3 and 4 (the number of actuating inverters is supposed to be the same) is decided with respect to the expected whole day solar radiation quantity fluctuation curve $H_a$. In other words, when the solar radiation quantity at the actuation start setting time point $t_1$ on the day when the power is generated exceeds the generated solar radiation quantity setting value $h_2$ which is preset based on the actuation pattern, the respective inverters 2, 3 and 4 start actuation, and when the solar radiation quantity after the expected actuation stop setting time point $t_o$ becomes less than the generated solar radiation quantity setting value $h_3$, the respective inverters 2, 3 and 4 are stopped actuation at that time point $t_2$. That is, the actuation pattern of the inverters are replaced with the actuation time of the inverters in this case.

In the above case, the actuation pattern for deciding an actuation start or an actuation stop of the respective inverters is based on the solar radiation quantity. However, since the respective inverters 2, 3 and 4 are directly subjected to the output of the solar cell array 1, the actuation start set time point $t_{10}$, etc. may be respectively set based on a power output set value $h_4$ of the solar cell array 1 with respect to a whole day output fluctuation curve $P_o$.

In this way, the respective inverters 2, 3 and 4 are decided the actuation time thereof by means of selection of a power capable pattern. More specifically, the respective inverters 2, 3 and 4 are decided the start or stop of actuation by receiving first through third inverter actuation instruction signals $S_2$, $S_3$ and $S_4$ generated respectively from the first through third inverter actuation apparatuses 12, 13 and 14 based on an instruction from the workable pattern selection means. Further, the respective inverters 2, 3 and 4 issue respective actuation detection signals $S_6$, $S_7$ and $S_8$, and the actuation inverter detecting means 16 detects the actuation state of the respective inverters 2, 3 and 4 (for example, which inverter among the respective inverters is in the actuation state and which one is in the actuation stop state). Upon receipt of the detection signals $S_6$, $S_7$ and $S_8$, the charge- and discharge control signal generation means 18 generates an upper limit electric power instruction signal $S_9$ corresponding to the upper limit value $P_a$ of the power for expected use on the date when the power is generated and a lower limit electric power instruction signal $S_{10}$ corresponding to the lower limit value $P_m$ of the power for expected use, and both the instruction signal $S_9$ and $S_{10}$ are outputted to the charge- and discharge control apparatus 6. Since the charge- and discharge control apparatus 6 receives a charge- and discharge instruction signal $S_{12}$ from the charge- and discharge permission control means 15, the storage battery 8 is charged and discharged according to surplus and shortage of the power for expected use of the generated power of the solar cell array 1. Since the storage battery 8 is provided with a storage battery monitor 7, remaining quantity of the storage battery 8 is always watched, and there is no such risk as an overcharge or undercharge. Although three units of inverter are employed in this embodiment, they may be suitably increased according to the load system and the required quantity.

As described in the foregoing, according to the present invention, a weather fluctuation pattern is set based on a forecasted weather information on the day when the power is generated, and an actuation pattern of the inverters is selected from this fluctuation pattern to control the actuation of inverters. Accordingly, a stable supply of an electric power is constantly obtainable irrespective of weather fluctuation or weather change on the day when the power is generated.

Although specific embodiment of the present invention has been shown and described in detail to illustrate the application of the principles of the present invention, it will be understood that the present invention may be embodied otherwise without departing from the spirit of the present invention.

What is claimed is:

1. A photovoltaic power control system equipped with at least one inverter for inverting an output of a solar cell array to AC power, and having charge- and discharge control means for charging a surplus portion with respect to the power for expected use of the output of said solar cell array to a storage battery and discharging shortage portion with respect to the power for expected use of the output of said solar cell array from said storage battery by detecting the surplus or shortage produced between the output of said solar cell array and AC power for expected use inverted by said inverter, the improvement comprising:

weather fluctuation pattern selection means for selecting one weather pattern out of various kinds of weather patterns preset based on weather information at a time point when the weather is forecasted on the day when the power is generated by said solar cell array; and workable pattern selection means for selecting one actuation pattern of the inverter corresponding to the weather pattern selected by said weather fluctuation pattern selection means out of various actuation patterns of the inverter preset corresponding to said weather pattern.

2. A photovoltaic power control system according to claim 1, wherein said actuation patterns of the inverter correspond to the number of actuating inverters of a predetermined capacity.

3. A photovoltaic power control system according to claim 1, wherein said actuation patterns of the inverter corresponds to actuation time of inverters of a predetermined capacity.

* * * * *